(12) United States Patent
Yang (10) Patent No.: US 7,367,581 B2
(45) Date of Patent: May 6, 2008

(54) BABY STROLLER FRAME WITH SEAT DIRECTION CHANGING MECHANISM

(75) Inventor: Cheng-Fan Yang, Tainan Hsien (TW)

(73) Assignee: Link Treasure Limited, Tortola (VG)

( * ) Notice: Subject to any disclaimer, the term of this patent is extended or adjusted under 35 U.S.C. 154(b) by 62 days.

(21) Appl. No.: 11/509,704

(22) Filed: Aug. 25, 2006

(65) Prior Publication Data

US 2007/0045975 A1 Mar. 1, 2007

(30) Foreign Application Priority Data

Aug. 26, 2005 (TW) ............... 94214688 U
Jul. 5, 2006 (TW) ............... 95211826 U (51) Int. Cl.
*B62B 1/00* (2006.01)

(52) U.S. Cl. .............. 280/642; 280/647; 280/658

(58) Field of Classification Search ............... 280/642, 280/647, 650, 651, 657, 658, 648, 47.38; 297/423.36, 284.8, 423.24, 321
See application file for complete search history.

(56) References Cited

U.S. PATENT DOCUMENTS

| | | | | |
|---|---|---|---|---|
| 4,790,548 A | * | 12/1988 | Decelles et al. | 280/5.26 |
| 5,060,967 A | * | 10/1991 | Hulterstrum | 280/650 |
| 5,366,274 A | * | 11/1994 | Roericht et al. | 297/321 |
| 5,727,848 A | * | 3/1998 | Gazard | 297/423.36 |
| 5,975,225 A | * | 11/1999 | Kamen et al. | 280/5.26 |
| 6,203,054 B1 | * | 3/2001 | Matsumoto | 280/647 |
| 6,513,827 B1 | * | 2/2003 | Barenbrug | 280/648 |
| 7,234,722 B1 | * | 6/2007 | Madigan et al. | 280/642 |

* cited by examiner

*Primary Examiner*—Hau Phan
(74) *Attorney, Agent, or Firm*—Muncy, Geissler, Olds & Lowe, PLLC (57) ABSTRACT

A baby stroller frame with a seat direction changing mechanism comprising a wheeled support frame, a seat support, a handle bar and a releasing mechanism. The wheeled support frame comprises a front leg, a rear leg and wheel sets. The upper portion of the wheeled support frame has a axle hole for pivotally connecting the seat support and allows the seat support rotatably to change its direction. The angle positioning of the seat support is lockable and releaseable by driving a locking member in a locking position. The releasing mechanism is slidably mounted on the handle bar, and shall concomitantly pulls locking member while the handle bar is rotated by a user. While the locking member is pulled to leave the locking position, the seat support will be free to rotate and change its direction.

18 Claims, 11 Drawing Sheets

BABY STROLLER FRAME WITH SEAT DIRECTION CHANGING MECHANISM

FIELD OF THE INVENTION

The present invention relates to a baby stroller frame with seat direction changing mechanism, and more particularly, to allow a seat support can change its direction by turning the handle bar of baby stroller.

DESCRIPTION OF THE RELATED ART

Baby stroller is provided for baby or small children that can be pushed by an adult for walking forwardly. Normally, the seat and handle bar of a baby stroller is fixed and the baby can only sit inside and then face forwardly, even though the baby is crying and would like see and talk with the adult who is pushing the stroller behind it.

To fulfill this situation, an example of a baby stroller as shown in U.S. Pat. No. 5,845,924 which discloses a handle bar of baby stroller is rotatable to change its direction. The handle bar is pivotally connected to a baby stroller frame and can be fixed direction either forwardly or backwardly. When the direction of the handle bar is changed, the baby can sit inside the baby stroller with the choice of facing and seeing the adult who is walking and pushing the baby stroller forwardly.

The baby stroller of U.S. Pat. No. 5,845,924 provides the good idea and the choice to the user, but some time it seems inconvenience when the user need to change the handle bar direction in a narrow or tiny space, for instance, in a crowded elevator. Further, as an ordinary rear wheel sets are direction-fixed, and the front wheel sets are normally direction-unfixed for easy steer when making a turn, it is difficult to take a left/right tune while the handle bar direction is changed and that swapped the front wheel and the rear wheel sets.

SUMMARY OF THE INVENTION

In order to overcome the drawbacks of the prior baby stroller, this invention provides a baby stroller frame with a seat direction changing mechanism. The user can control the mechanism to change the direction of the seat without changing the direction of the handle bar, and the baby can have the choice to sit either in direction of facing forwardly or facing the adult backwardly.

The embodiment of baby stroller of the present invention comprises a support frame, a seat support, a handle bar and a releasing mechanism, wherein the support frame includes a front leg, a rear leg and wheel sets. An upper end of the support frame is provided with an axle hole for lockably and pivotally support the seat support and allowing the seat support to rotate and change its direction on top of the support frame. The releasing mechanism comprises a locking member for locking the seat support into a predetermined direction. The locking member of the releasing mechanism is control by turning the handle bar, when changing the direction of the seat support.

Additional objects and advantages of the invention will be set forth in the following description and it is easy for a person having ordinary skill in this art to infer other variations from above illustrations and embodiments. It is to be understood that both the foregoing general description and the following detailed description are exemplary and explanatory only and are not restrictive of the invention, as claimed.

DETAILED DESCRIPTION OF THE PREFERRED EMBODIMENTS

With reference to FIGS. 1 to 5, an embodiment of the stroller frame of the present invention includes a wheeled support frame 1, a seat support 4, a handle bar 10 and a releasing mechanism 5. The wheeled support frame 1 comprises a front leg 11, a rear leg 12 and wheel sets 13, 14. The upper portion of the wheeled support frame 1 is provided with a pivotally support base 3 having an axle hole 32 on the top for pivotally connecting the seat support 4 that allows the seat support 4 rotatably changing its direction about the axle hole 32 on top of the wheeled support frame 1.

The releasing mechanism 5 includes a locking member 75 for locking the seat support 4 into a fixed direction status. The releasing mechanism 5 is slidably disposed on the handle bar 10 for actuating the turning of handle bar and the locking member 75 can be pulled by turning the handle bar 10 to set the seat support 4 into a rotatable status, that makes the seat support 4 to be rotatable for changing direction.

The front leg 11 and rear leg 12 are pivotally connected at the lower portion of the pivotally support base 3. The lower end of the front leg 11 is provided with a front wheel set 13. The front wheel set 13 can be either a direction-fixed or direction-unfixed wheel set. The lower end of the rear leg 12 is provided with a direction-fixed rear wheel set 14. A linking rod 15 is pivotally is pivotally interconnected the rear leg 11 and front leg 12.

Figure 3:
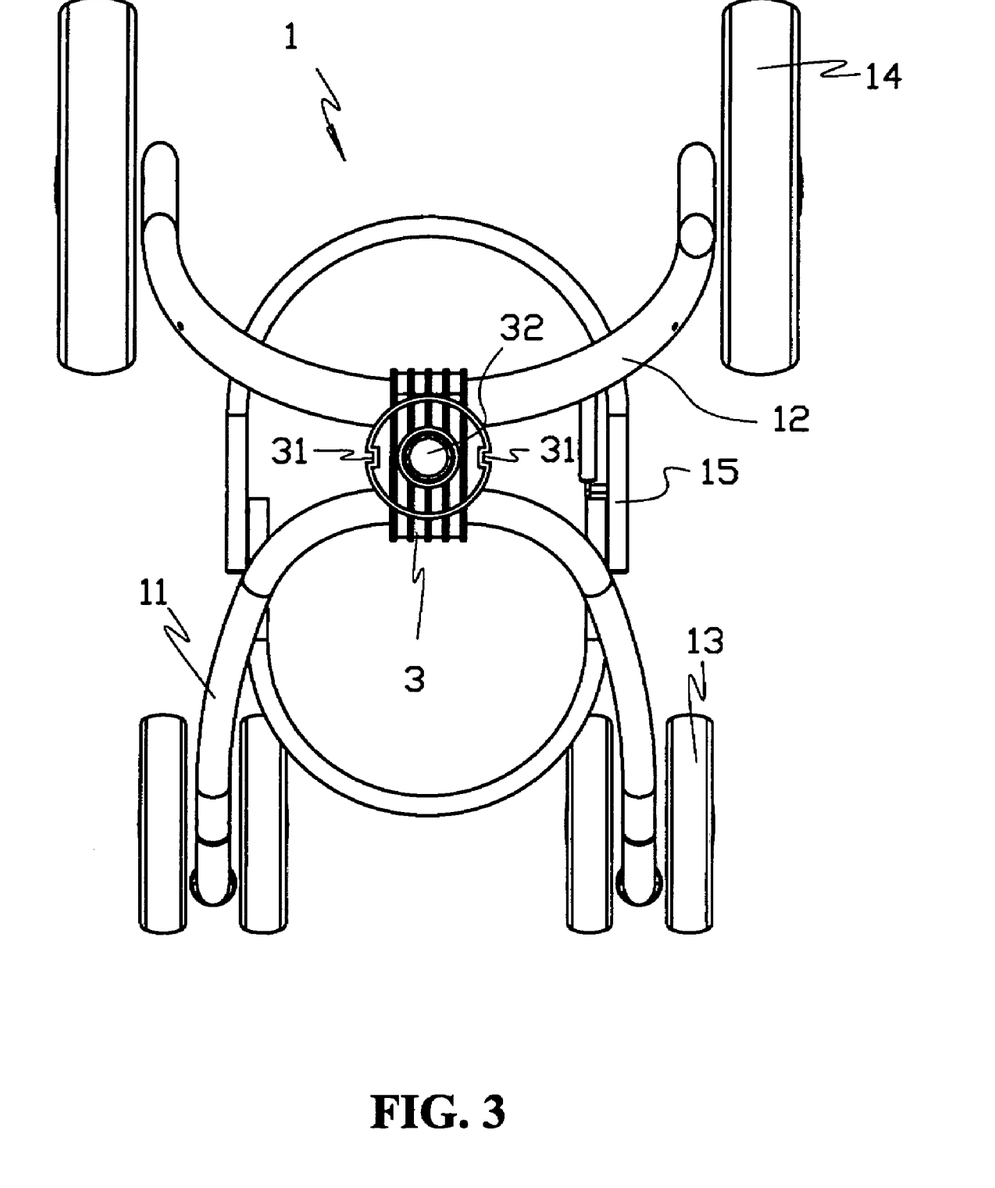
FIG. 3 is a top view of the support frame of the stroller frame of the present invention.

Referring to FIG. 3, the pivotally support base 3 is formed with the axle hole 32 and a pair of locking positions 31. The pair of locking positions can be formed as two recesses or indents on the circumference of the pivotally support base 3 with an angle of 180° apart.

Figure 4:
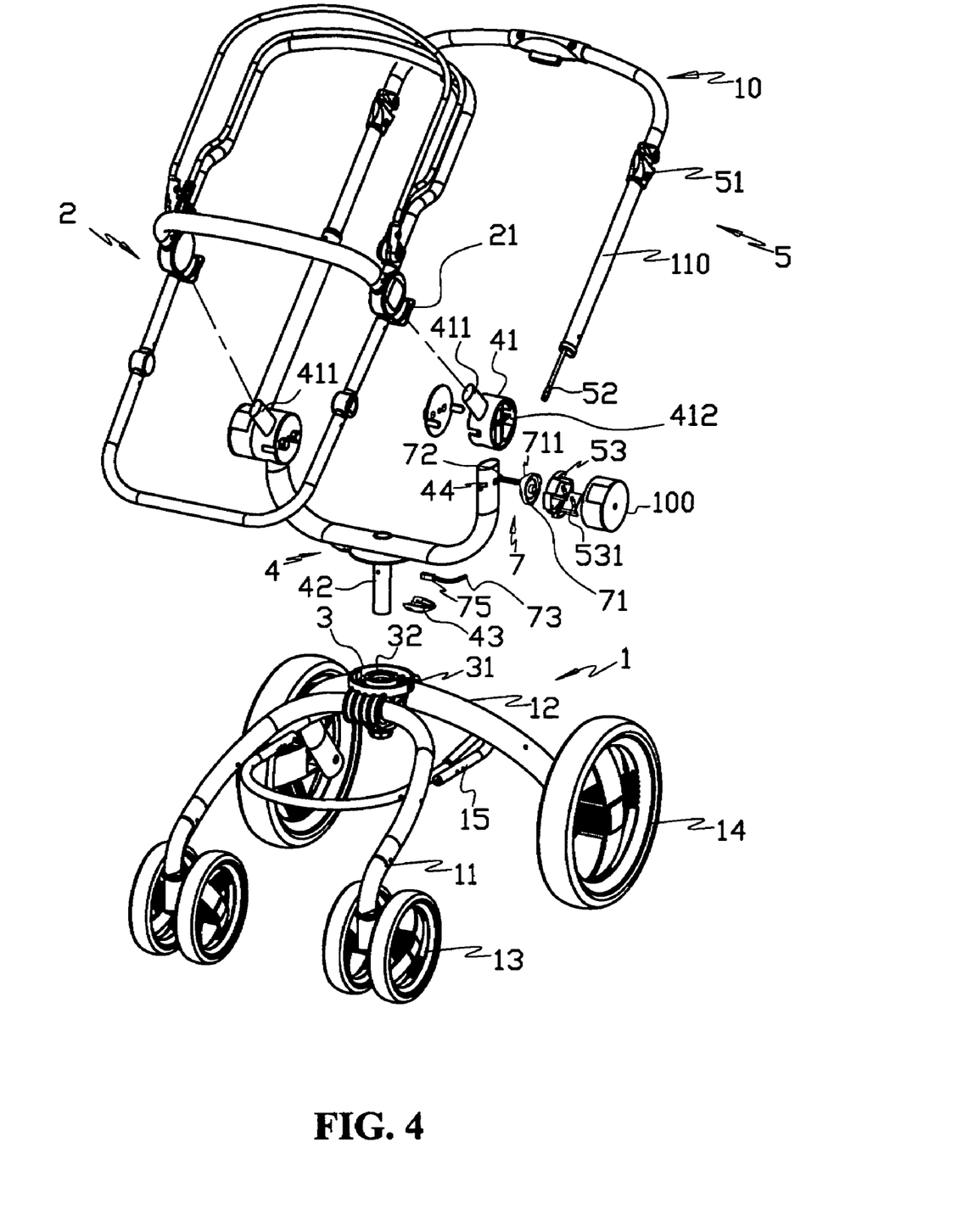
FIG. 4 is an exploded perspective view of the stroller frame of the present invention.

Referring to FIG. 4, the seat support 4 has an axle 42 extended downwardly from lower end for pivotally received and retained within the axle hole 32 and a pair of arms extended upwardly for detachably connecting with a seat frame 2, a carry cot or a vehicle safety seat (not shown). Each end of the arms of the seat support 4 are provided with a connecting base 41 which having a connecting portion 411 extended therefrom.

The connecting base 41 includes a connecting portion 411 and a positioning groove 412. The positioning groove 412 is used to slidably engage with a releasing member 53 for locking the handle bar 10 in either fixable or rotatable status.

As the seat frame 2 is provided to support a seat, a carry cot or a baby vehicle safety seat, each side of the seat frame 2 is provided with a socket 21 for detachably mounting on the connecting portion 411 of the seat support 4.

Figure 5:
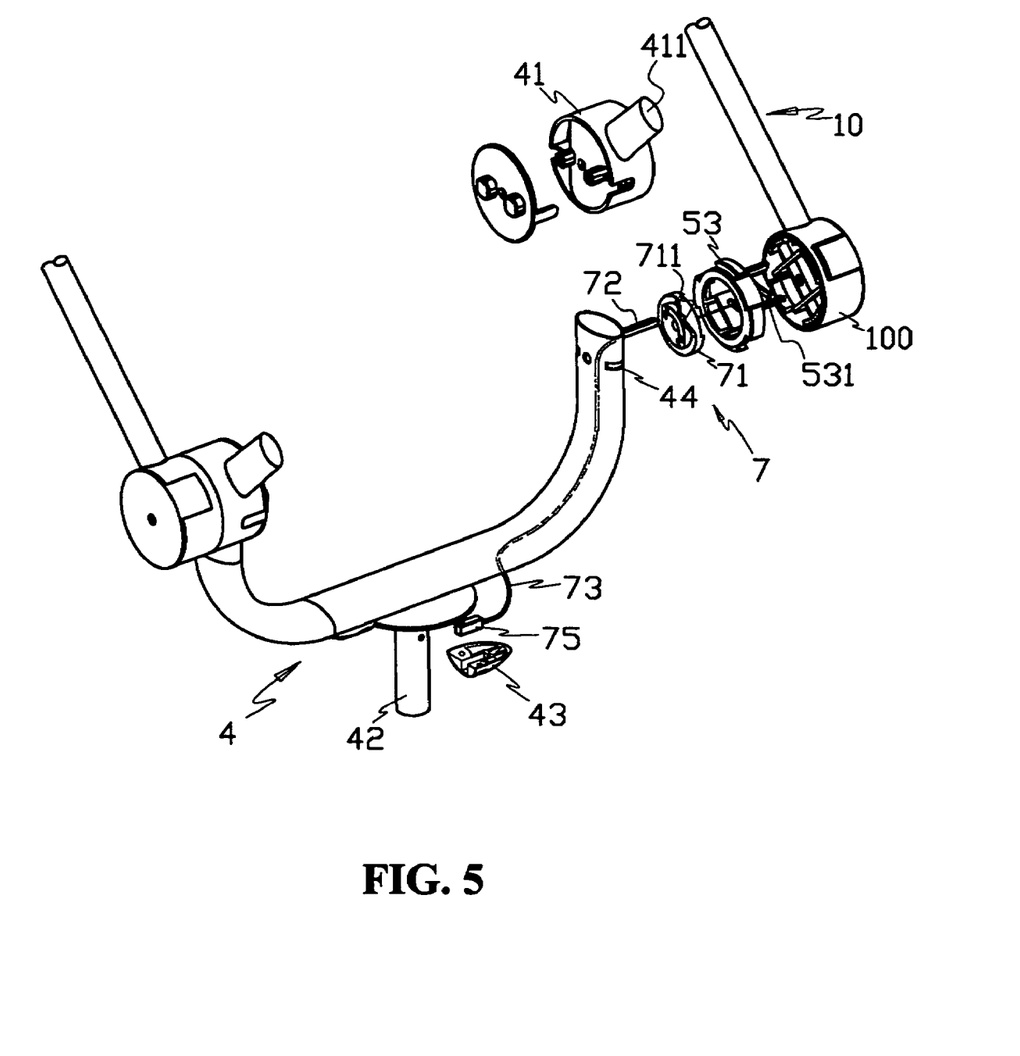
FIG. 5 is an exploded perspective view that showing the connection between the handle bar and the seat support of the present invention.

The handle bar 10 comprises a pair of side tubes 110 each provided with a swivel base 100 at the end portion. The swivel base 100 is pivotally connected to the connecting base 41 that allowed the handle bar 10 to be rotatable and lockable in an inclined angle.

Figure 1:
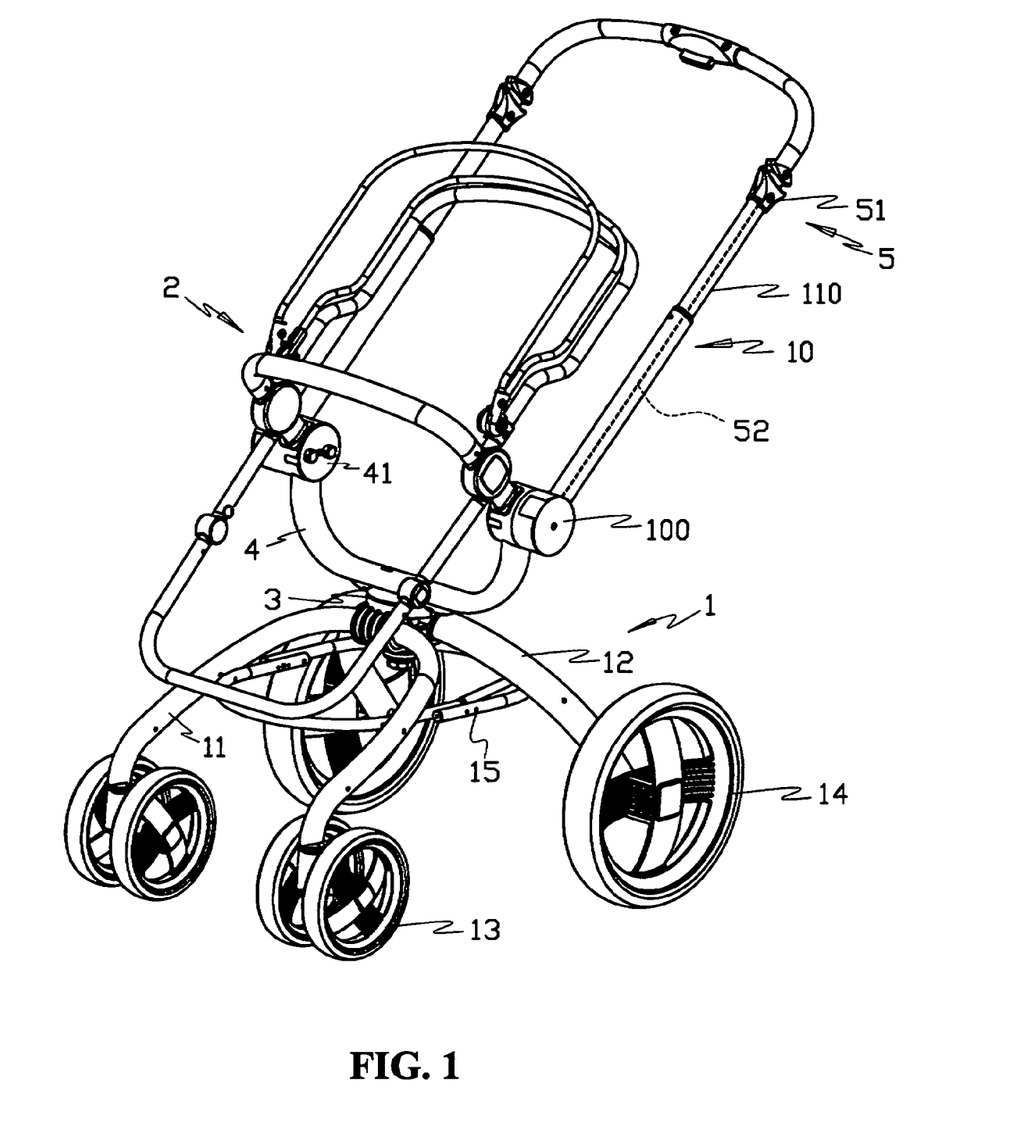
FIG. 1 is a perspective view of a stroller frame according to the present invention.
Figure 2:
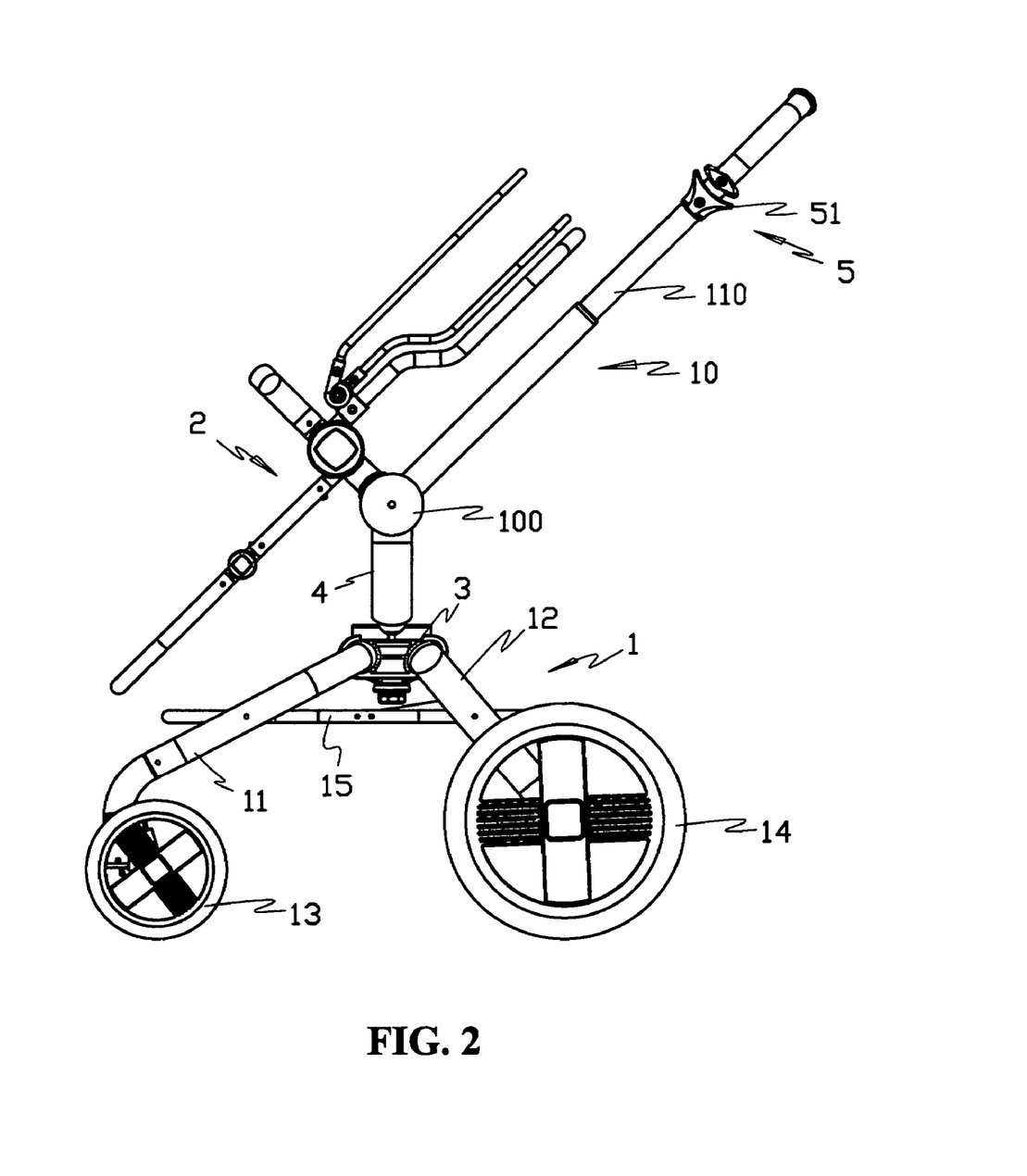
FIG. 2 is an elevational side view of the stroller frame with a seat support in a direction of facing forwardly.
Figure 7:
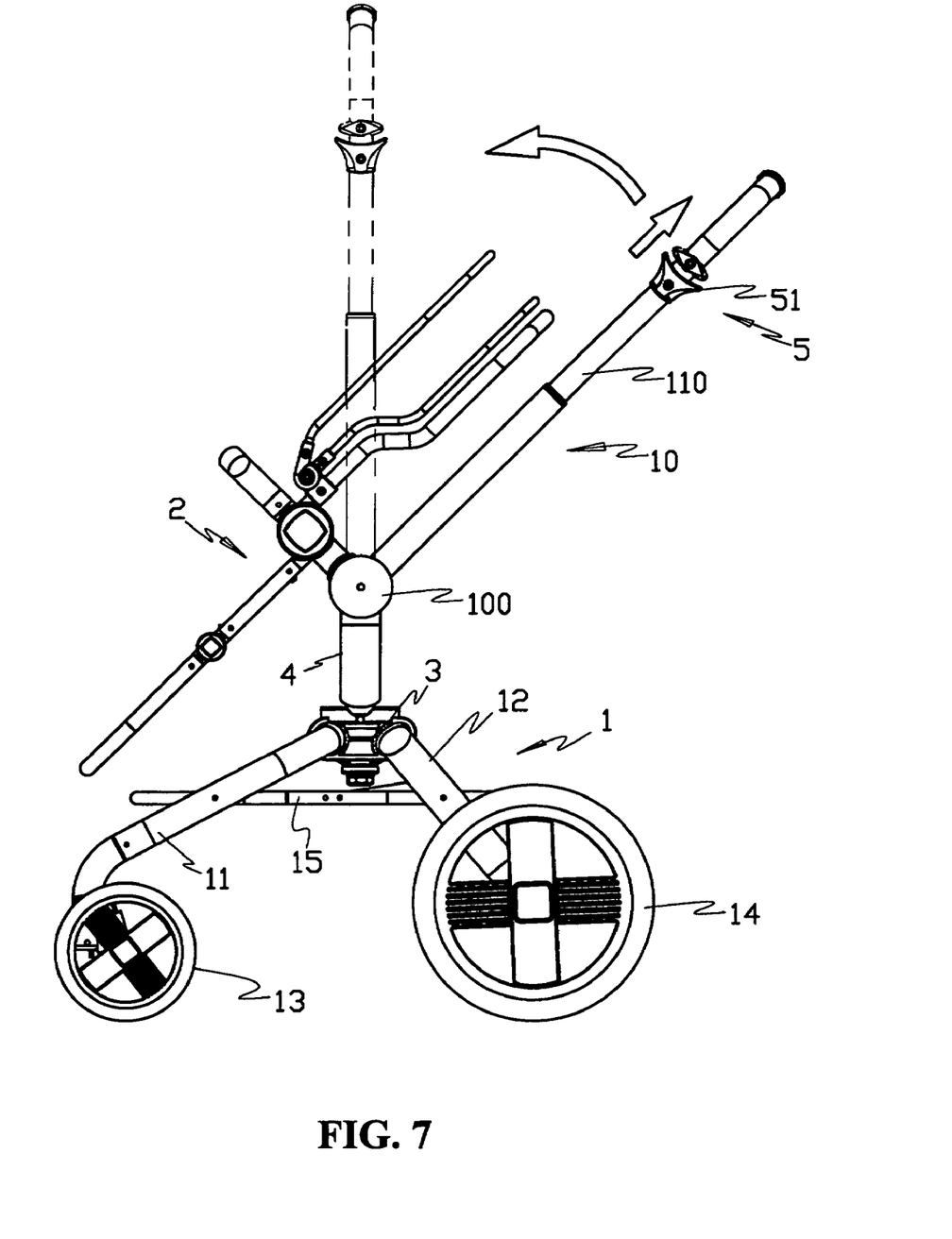
FIG. 7 is an illustrative elevational side view showing the operation of the handle bar when changing the direction of the seat support.
Figure 10:
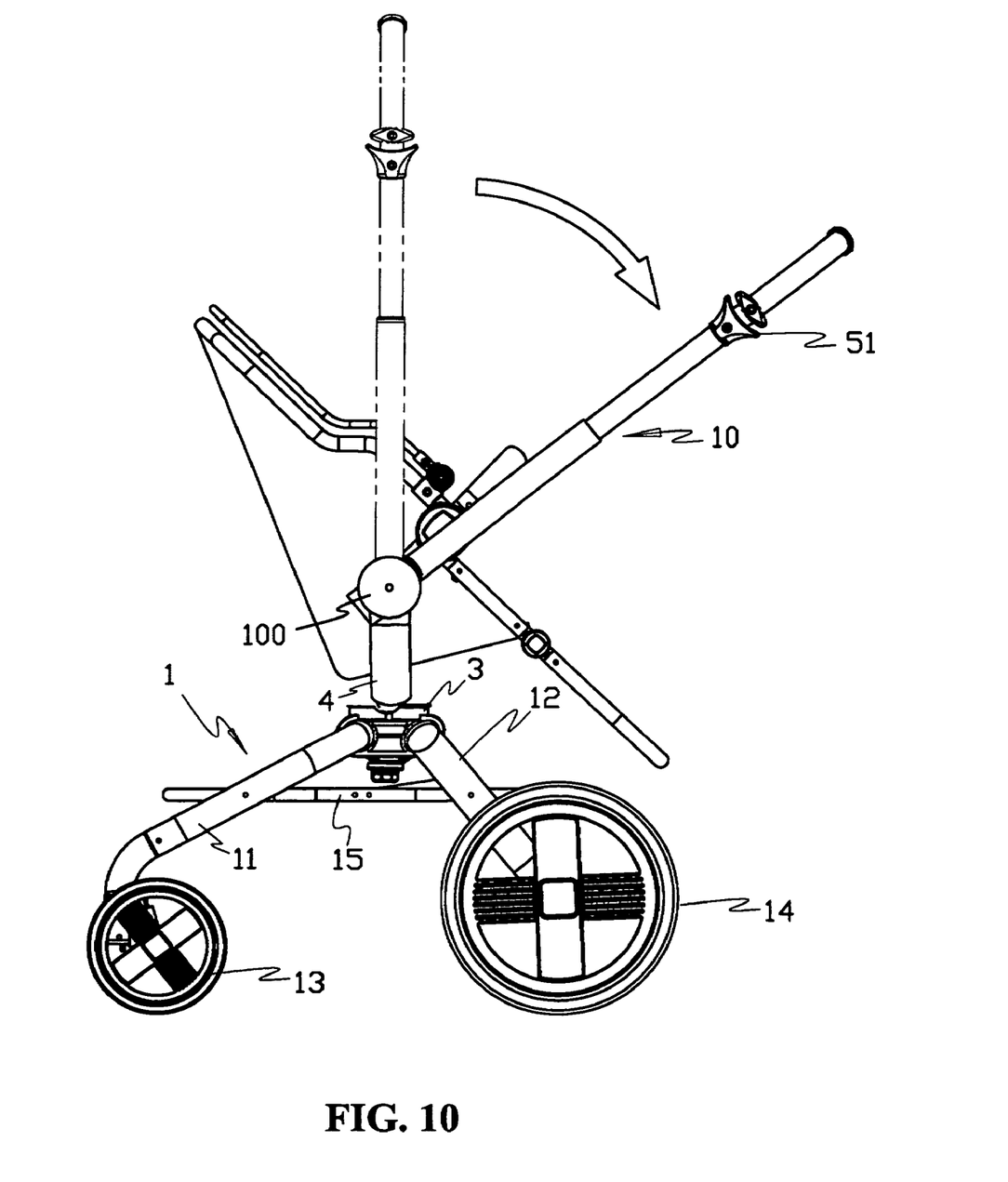
FIG. 10 is an illustrative side view showing rotation of a handle bar to fix the seat support in a rearward direction.

Refering to FIGS. 2, 7 and 10, the handle bar 10 is rotatable when the releasing mechanism 5 actuated the rotation of the handle bar 10.

Figure 6:
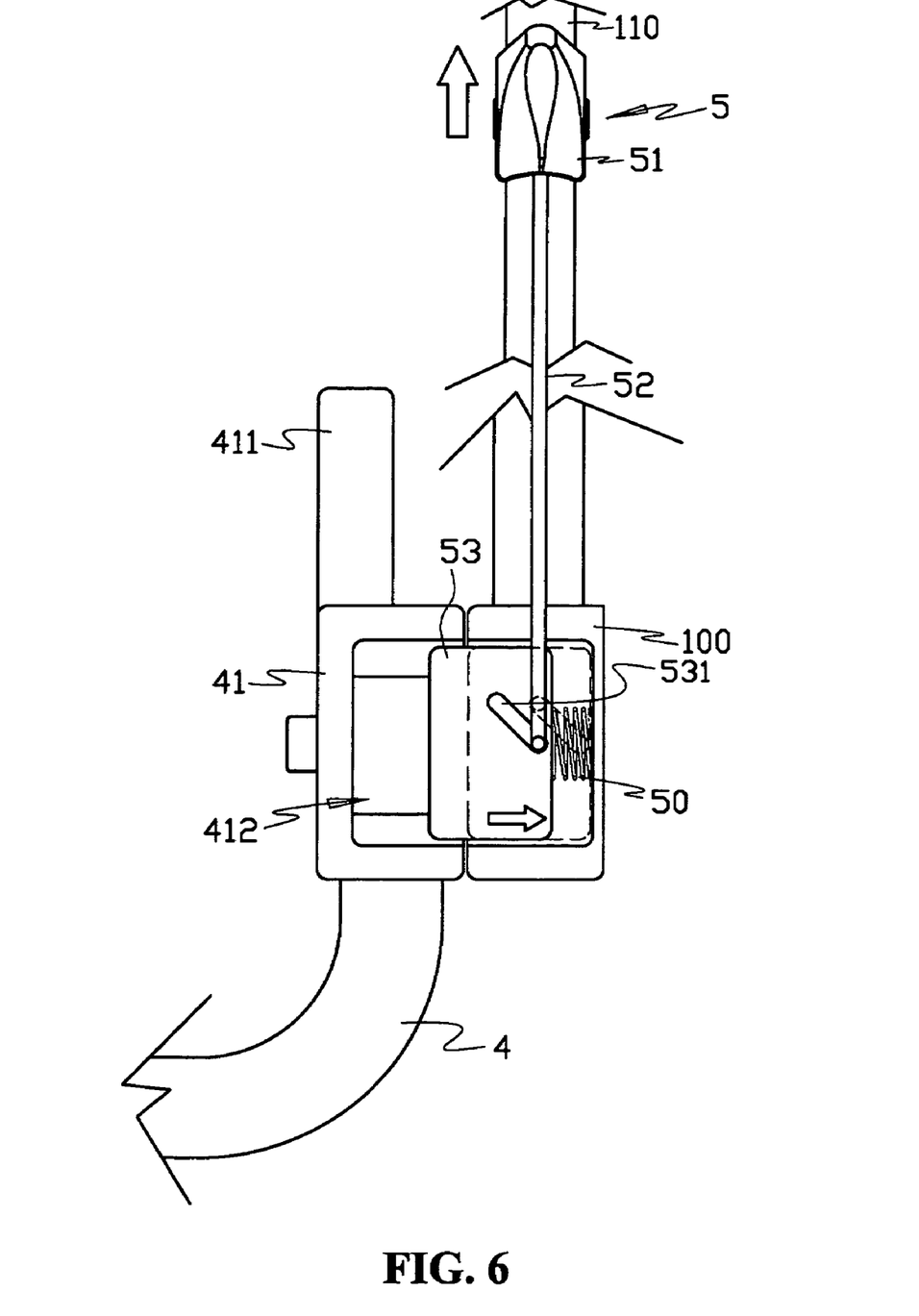
FIG. 6 is an illustrative view showing the operation of the releasing mechanism and the swivel base according to the present invention.

An embodiment of the releasing mechanism 5 as shown in FIG. 6 includes a sliding sleeve 51, a connecting member 52, a releasing member 53 and a resilient member 50. The sliding sleeve 51 is slidably mounted on the side tubes 110. The connecting member 52 is interconnected the sliding sleeve 51 and the releasing member 53. The releasing member 53 has a skewed slot 531 and is linely slidably engaged within the swivel base 100. The resilient member 50 is arranged between the releasing member 53 and the swivel base 100.

The inside of connecting base 41 is formed with one or a plurality of positioning groove 412 for engaging with the releasing member 53 in one or several angle position. The upper end of connecting member 52 is connected to the sliding sleeve 51 and the lower end of connecting member 52 is slidably engaged within the skewed slot 531. When a user pulled the sliding sleeve 51, the lower end of the connecting member 52 shall slides along the skewed slot 531 and and yields a component of force to pull back the releasing member 53 from the positioning groove 412 against the resilient member 50. By this way, the handle bar 10 is rotatable and adjustable in angle.

When the sliding sleeve 51 is released, the resilient member 50 keeps biasing against the releasing member 53 to force it engage with the positioning groove 412. The engagement of releasing member 53 within the positioning groove 412 prevents the handle bar 10 from freely rotation.

Figure 8:
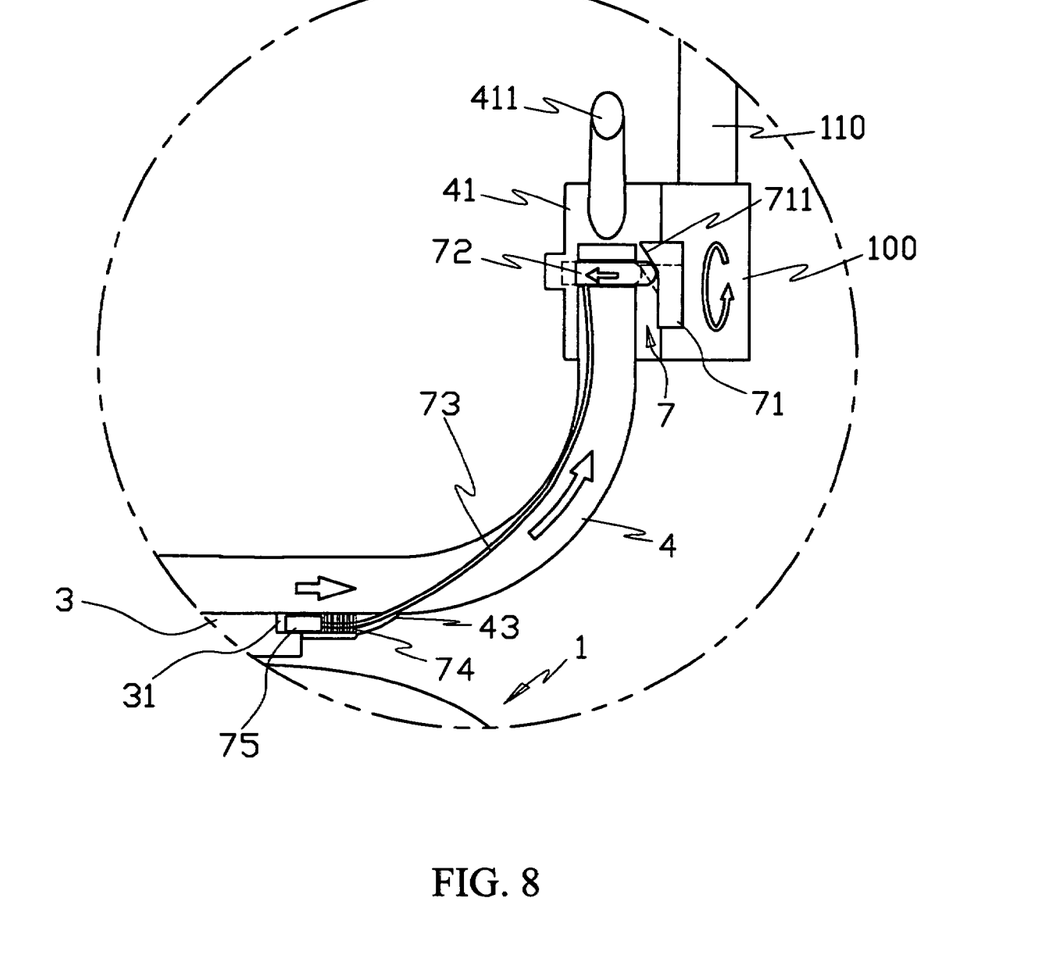
FIG. 8 is an illustrative partial enlarged view showing the operation of the driver when changing the direction of the seat support.
Figure 11:
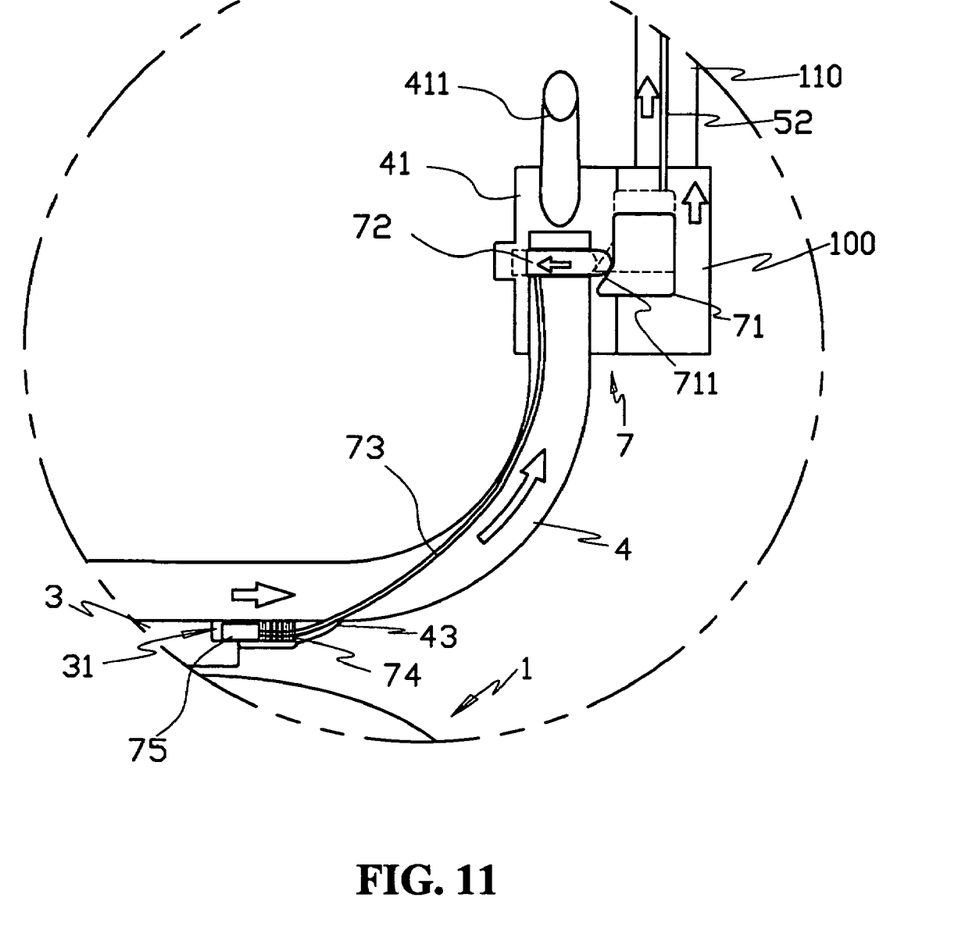
FIG. 11 is an illustrative partial enlarged view showing the operation of the locking member disengaged from a locking position when changing the direction of the seat support.

As shown in FIGS. 5, 8 and 11, the releasing mechanism 5 may further includes a driver 7 which comprises a sliding block 72, a linking member 73, a resilient member 74 and a locking member 75. The seat support 4 may further includes a guiding cover 43 for slidably receiving the locking member 75 to slide reciprocally therein. As shown in FIG. 8, the resilient member 74 is disposed in the guiding cover 43 for biasing the distal end of locking member 75 for keeping to engage within the locking position 31 on the pivotally support base 3, so as to fix the direction of the seat support 4.

Referring to FIGS. 5 and 8, the linking member 73 may be a flexible, such as string or wire. The driving disc 71 is rotatably arranged inside the swivel base 100 and may be rotated about the swivel base 100. The driving disc 71 can be formed with a slope face 711 for slidably contacting and pushing the sliding block 72 lineably and reciprocally inside the sliding groove 44. The sliding block 72 has one end to abut and slidably contact with the slope face 711, this makes the other end of sliding block 72 to pull the linking member 73. In the present embodiment, the linking member 73 has a length disposed inside the seat support 4, and connects the locking member 75.

Turning now to FIG. 8, when the handle bar 10 led the swivel base 100 to rotate, the slope face 711 pushes the sliding block 72 to drive the locking member 75. When the handle bar 10 is rotated near to the pivotally support base 3, the locking member 75 would be pulled to disengage from the locking position 31 of the pivotally support base 3.

As shown in FIGS. 6 and 7, the direction of a seat frame 2 can be change by pulling the sliding sleeve 51 to disengage the releasing member 53 from the positioning groove 412, so as to make the handle bar 10 to be rotatable. When the handle bar 10 is rotated, the driving disc 71 would pull the sliding block 72, that cause the linking member 73 disengage the locking member 75 from the locking position 31. While locking member 75 disengaged from the locking position 31, the seat support 4 is freely rotatable for changing its direction.

With reference to FIG. 8, the swivel base 100 following the handle bar 10 to rotate, that cause the slope face 711 pushes the sliding block 72 to drive the locking member 75. When the handle bar 10 is rotated to near the pivotally support base 3, the locking member 75 would be disengaged from the locking position 31, that allows the seat support 4 to change its direction.

Figure 9:
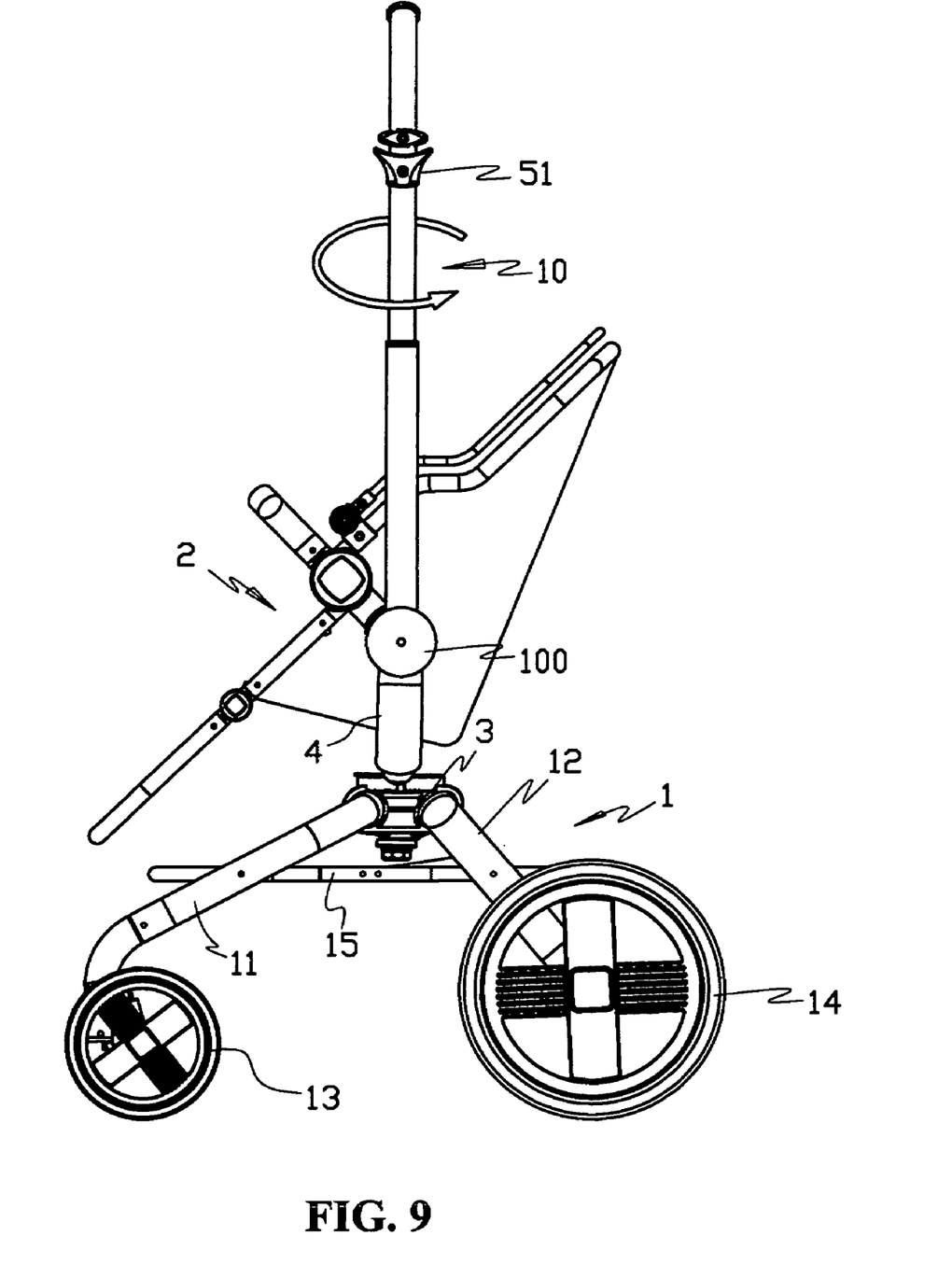
FIG. 9 is an illustrative side view showing the operation of a handle bar to propel the seat support which connected with a seat thereon.

As shown in FIG. 9, in the meantime, the user can levelly rotates the handle bar 10 to drive the seat support 4 to change the direction of the seat frame 2, or the carry cot or the car seat (no shown) whenever it is connected to the seat support 4.

Further referring to FIG. 10, when the user pulled back the handle bar 10, the resilient member 74 is biasing against the locking member 75 to engage into the locking position 31; by this way, the direction of the seat support 4 can then be fixed automatically.

The front wheel set 13 of the present invention, may be an direction-unfixed wheel set, and the rear wheel set 14 is generally a direction-fixed wheel set; the handle bar 10 can be retained to the side near the rear wheel set 14 for the user to push and steer the stroller more easily.

As the pair of locking positions 31 apart from each other with 180°, the direction of the seat support 4 can either be the forward or backward of the stroller. A person who skilled in the art, may know that the locking positions 31 can be more than two position, and the locking positions 31 can be apart from each other less than 180°; for instance, 90° for adding the direction setting choice of the seat frame 2 for fun.

What is claimed is:

1. A baby stroller frame, comprising:
a wheeled support frame, including a pivotally support base, a linking rod, a front leg, a rear leg, a front wheel set and a rear wheel set; wherein the pivotally support base is provided with a locking position and the front and the rear leg are pivotally connected at the lower portion of the pivotally support base; the linking rod is pivotally interconnected the front leg and the rear leg; the lower ends of the front leg and the rear leg are connected the front wheel set and the rear wheel set respectively;
a seat support, pivotally connected to the pivotally support base; the seat support having a pair of arms provided with a pair of connecting bases each having a connecting portion extended outwardly;

a locking member, disposed between the seat support and the pivotally support base for preventing the seat support to be rotatable about the pivotally support base when the locking member is slidably engaged within the locking position;

a handle bar, pivotally connected to the arms of the seat support body for pushing the stroller; and a releasing mechanism, connected between the handle bar and the locking member; the releasing the mechanism is driven by the rotation of the handle bar to disengage the locking member from the locking position.

2. A baby stroller frame according to claim 1, wherein the pivotally support base is provided with an axle hole for pivotally supporting the seat support.

3. A baby stroller frame according to claim 2, wherein the seat support has an axle extended downwardly from lower end for pivotally retained within the axle hole.

4. A baby stroller frame according to claim 1, wherein the pair of connecting bases is used for detachably connecting a seat frame.

5. A baby stroller frame according to claim 1, wherein the pair of connecting bases is used for detachably connecting a baby carry cot.

6. A baby stroller frame according to claim 1, wherein the pair of connecting bases is used for detachably connecting a baby safety seat.

7. A baby stroller frame according to claim 1, wherein the seat support further includes a guiding cover for slidably receiving the locking member to slide reciprocally therein.

8. A baby stroller frame according to claim 1, wherein the handle bar comprises a pair of swivel bases which are pivotally connected to the connecting bases that allows the handle bar to be either lockable or rotatable.

9. A baby stroller frame according to claim 8, wherein the releasing mechanism includes a sliding sleeve, a connecting member, a releasing member and a resilient member, wherein the connecting member interconnects the releasing member and the sliding sleeve, and the resilient member is biasing the releasing member to slidably engage with the connecting base.

10. A baby stroller frame according to claim 1, wherein when the handle bar is rotated toward the top of the pivotally support base, the locking member is released from the locking position.

11. A baby stroller frame according to claim 1, wherein the swivel base disposed at the seat support further including a driving disc and a linking member; that when the driving disc is rotated, the locking member is released from the locking position by pulling of the linking member.

12. A baby stroller frame according to claim 11, wherein the driving disc is located inside the swivel base and rotates together with the swivel base rotation.

13. A baby stroller frame according to claim 11, wherein the linking member is flexible.

14. A baby stroller frame according to claim 11, wherein the seat support further includes a driver comprising a sliding block which connected to the locking member by the linking member; that the sliding block is driven by rotating the swivel base to pull the locking member from the locking position.

15. A baby stroller frame according to claim 14, wherein the driving disc has a slope face for slidably contacting the sliding block to move it linearly back and forth.

16. A baby stroller frame according to claim 14, wherein the sliding block is slidably disposed within the arms of the seat support.

17. A baby stroller frame according to claim 14, wherein the locking member is released from the locking position by pulling of the releasing mechanism which is driven by the rotation of the handle bar.

18. A baby stroller frame according to claim 17, wherein the driver is in relation to the sliding sleeve which pulls the connecting member that indirectly disengages the locking member from the locking position.

* * * * *